Dec. 15, 1970  K. M. POOLE  3,547,530

OVERHEAD PROJECTOR

Filed Nov. 12, 1968  3 Sheets-Sheet 1

INVENTOR
K. M. POOLE
BY
Francis E. Morris
ATTORNEY

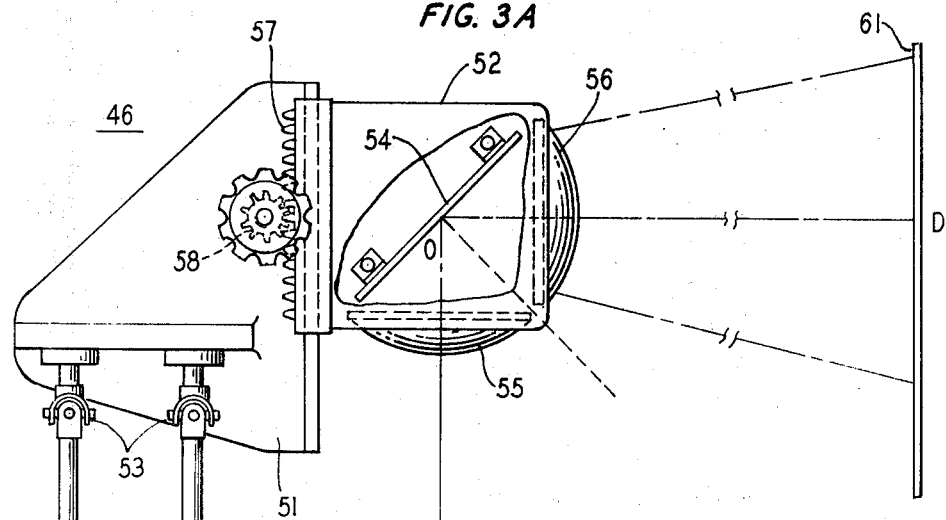
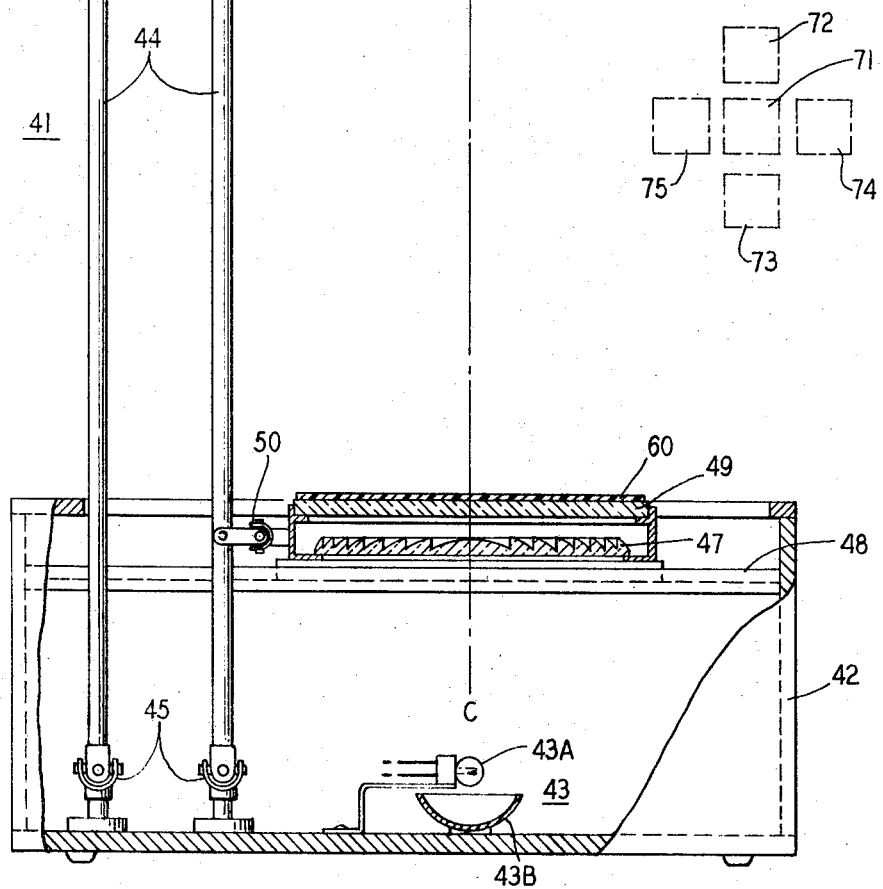

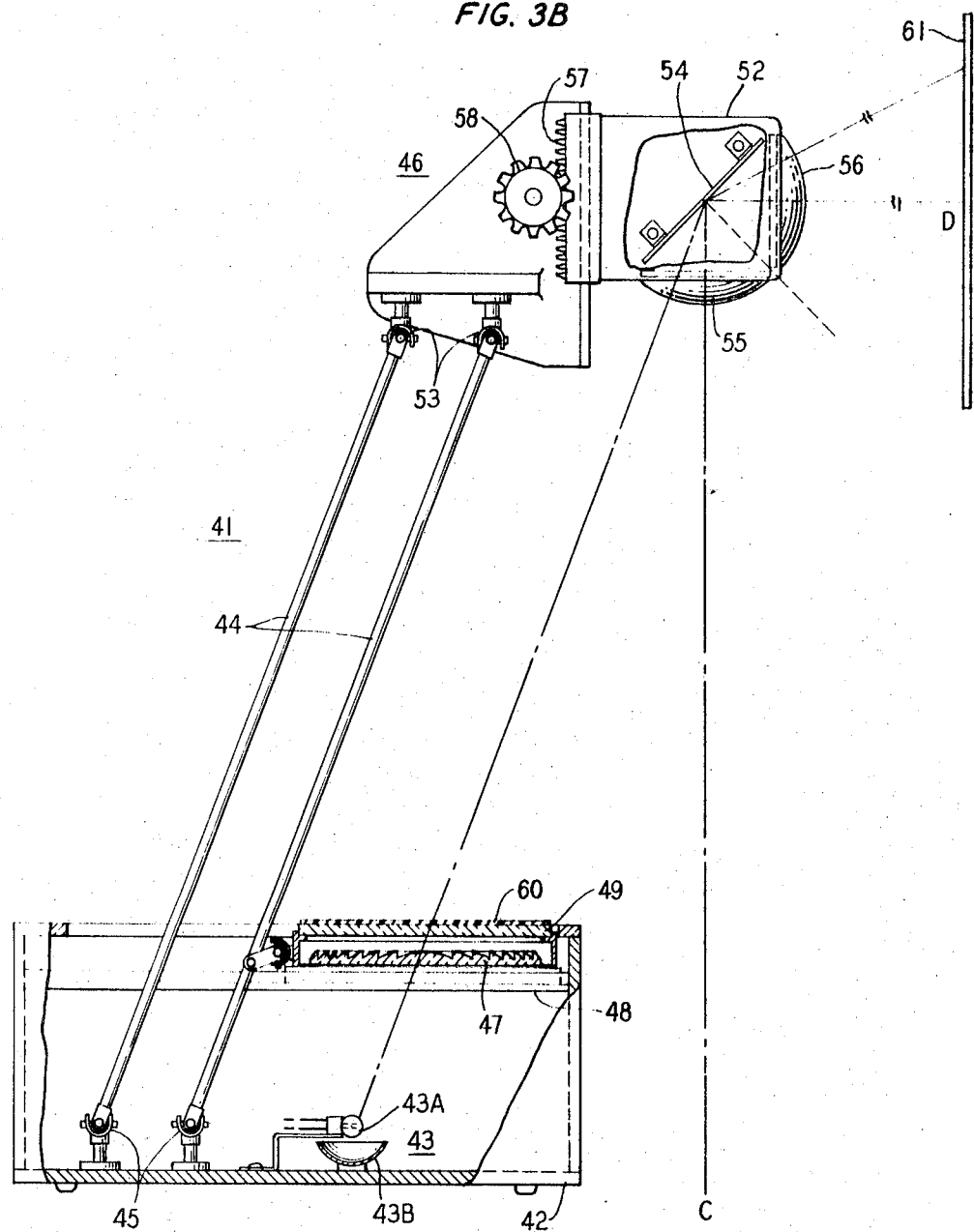

United States Patent Office 3,547,530
Patented Dec. 15, 1970

3,547,530
OVERHEAD PROJECTOR
Kenneth M. Poole, Bernardsville, N.J., assignor to Bell Telephone Laboratories, Incorporated, Murray Hill, N.J., a corporation of New York
Filed Nov. 12, 1968, Ser. No. 774,912
Int. Cl. B03b 21/00
U.S. Cl. 353—70                                       8 Claims

ABSTRACT OF THE DISCLOSURE

An overhead projector is disclosed that eliminates keystone distortion and loss of focus when projecting an image of an object at an angle to a display surface. Angular projection is achieved by translating a reflecting surface and imaging lenses in the projector head laterally with respect to the object. Keystone distortion and loss of focus are avoided by translating the reflecting surface and imaging lenses so that a normal to the reflecting surface intersects a plane through the object at a constant angle, regardless of the lateral displacement of the reflecting surface and imaging lenses with respect to the object.

---

My invention relates to projectors and in particular to overhead projectors.

An overhead projector is typically comprised of a light source, mounting means for holding an object where it can be illuminated by the light source, and a projector head mounted above the object. In operation, light is directed from the light source to the object and thence to the projector head above the object. Suitable means in the projector head then redirects the light and images it onto a display screen situate in front of the projector. Ordinarily, when an image of an object, such as a transparency, is to be formed on a screen located above as well as in front of an overhead projector, light is directed upwards by tilting a mirror in the projector head. As the height of the image above the projector is increased, however the image becomes larger at the top than at the bottom, an annoying distortion called keystone distortion. In addition, with the standard overhead projector having a tilting mirror for projection in a vertical direction, the best focus is achievable only along one horizontal band across the image formed on the display screen.

Accordingly, it is an object of my invention to provide an improved overhead projector.

It is a further object of my invention to provide an overhead projector that substantially reduces keystone distortion when projecting an image at an angle.

And it is still another object of my invention to provide an overhead projector that can achieve best focus over a substantial portion of the image formed on the display screen.

In an illustrative embodiment of my invention, projection at an angle is achieved by translating a reflecting surface and imaging lenses in the projector head laterally with respect to the object. Keystone distortion and loss of focus are avoided by translating the reflecting surface and imaging lenses so that a normal to the reflecting surface intersects a plane through the object at a constant angle, regardless of the displacement of the reflecting surface and imaging lenses with respect to the object.

The apparatus for achieving such translation of the reflecting surface and imaging lenses while maintaining the specified angle comprises at least three parallel projector head support rods, each of which is mounted in universal joints in the base of the device and in the projector head.

These and other objects and features of my invention will be better understood from a consideration of the following detailed description taken in conjunction with the accompanying drawing in which:

FIGS. 3A and 3B are schematic illustrations of my overhead projector; and

FIG. 4 is a sketch showing that my overhead projector avoids keystone distortion.

DETAILED DESCRIPTION

Figure 1:
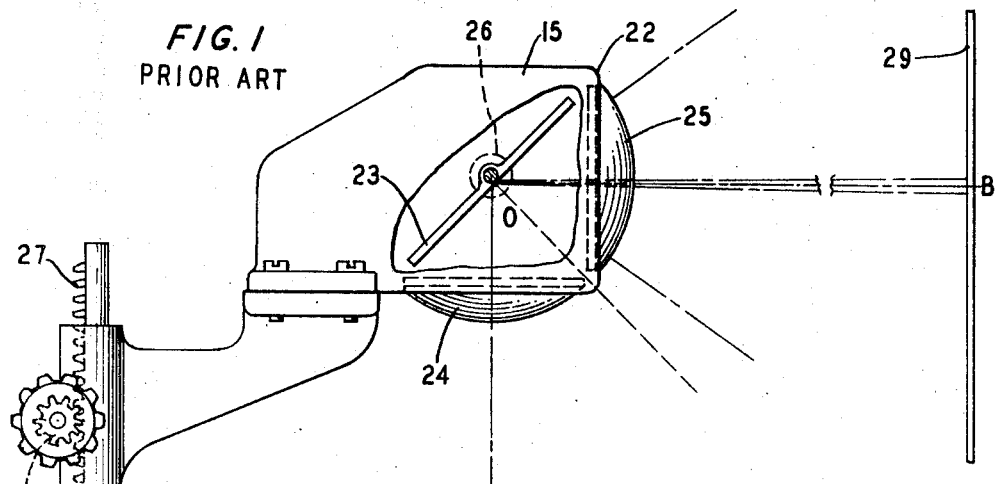
FIG. 1 is a schematic illustration of a prior art overhead projector.
Figure 1:
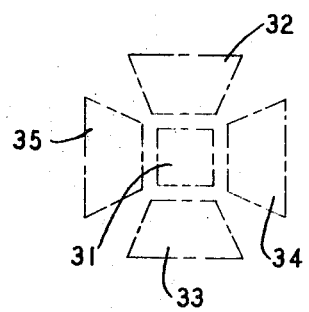

In FIG. 1 there is shown a typical, prior art overhead projector 11. The device comprises a box 12 in which there is a light source 13, a bracket 14 securely fastened at one end to box 12, and a projector head, or light directing means, 15, supported by bracket 14 over box 12.

Light source 13 comprises a filament 13A and a spherical reflector 13B mounted concentric with filament 13A. Box 12 is ordinarily opaque on all sides except the side opposite projector head 15 where there is a transparent plate 16. Parallel to this plate, a Fresnel condenser lens 17 is mounted in the box between light source 13 and plate 16 in such a position as to focus the light source at projector head 15.

Projector head 15 is comprised of a casing 22 in which is a mirror 23 and at least one imaging lens. In the typical projector head imaging system shown in FIG. 1, lens 24 is situated between mirror 23 and the light source and lens 25 between mirror 23 and a display surface 29 onto which the light is imaged. Optical axis OA of lens 24 is perpendicular to optical axis OB of lens 25 at the reflecting surface of mirror 23; axes OA and OB and a normal to mirror 23 all lie in the same plane, namely, the plane of the drawing; and Fresnel lens 17 is centered about and transverse to optical axis OA so that its optical axis coincides with axis OA, in which position lens 17 focuses light source 13 at lens 24.

Mirror 23 is so mounted in casing 22 that by rotating a knob 26 it can be tilted about an axis situate in the plane of the mirror and transverse to both optical axis OA and optical axis OB. In such a position, mirror 23 can be said to reflect the optical axis of the projector head imaging system from an incident axis represented by axis OA to a reflected axis represented by axis OB. Consequently, rotation of knob 26 alters the optical axis of the projector head imaging system because movement of mirror 23 changes the direction of light reflected by the mirror and therefore alters the location of at least one of the focal points of the system. When mirror 23 is so positioned that the angles between its normal and optical axis OA and between its normal and optical axis OB are both 45°, the optical axis of the projector head imaging system is coincident with line AOB. For other positions, and hence other angles, it is not.

Projector head 15 in turn, is mounted on bracket 14 so that it can be raised and lowered by suitable means. Typically, the upper portion of bracket 14 is notched to form a rack 27; and a pinion gear 28 connected to projector head 15 is used to raise and lower projector head 15 on rack 27. Appropriate clamps, not shown, allow any mirror tilt or any projector head position to be maintained as long as desired.

In operation, the object that is to be illuminated and projected onto display surface 29 is placed on top of glass plate 16. Typically this object is a flat transparency, shown as element 18 in FIG. 1. Light from light source 13 is directed through Fresnel lens 17, glass plate 16, and transparency 18 and is then incident on lens 24 of projector head 15. This light next goes through lens 24, is reflected by mirror 23 onto lens 25 and is imaged onto display surface 29. The image on the display surface is focused by adjusting the distance between projector head 15 and transparency 18 by means of rack 27 and pinion gear 28.

Figure 2:
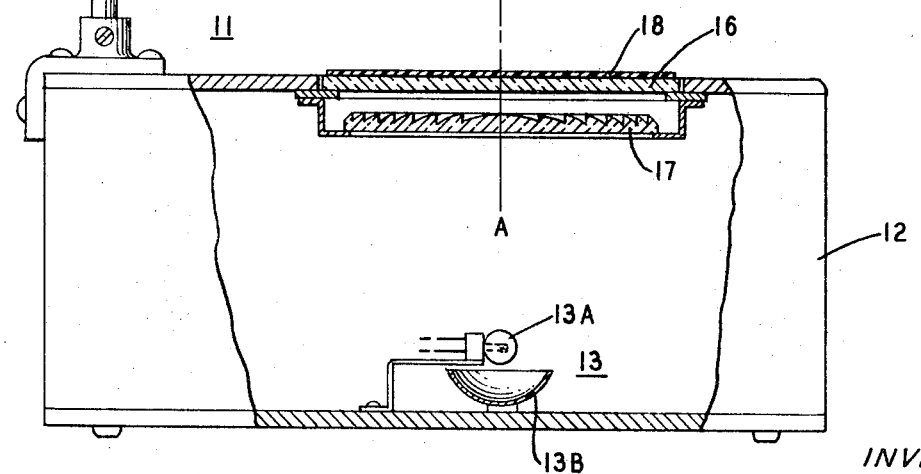
FIG. 2 is a sketch of the keystone distortion encountered when using a prior art projector.

When mirror 23 is so positioned that the optical axis of the projector head imaging system is coincident with line AOB, light incident on mirror 23 along optical axis OA of lens 24 is reflected out of the projector head along optical axis OB of lens 25. Consequently, the image of transparency 18 is centered about optical axis OB. In such a case, if transparency 18 is a square and if the transparency is transverse to optical axis OA of the projector head imaging system and display surface 29 is transverse to optical axis OB so that both transparency and display surface are transverse to the optical axis of the projector head imaging system, the image that is formed on display surface 29 is also a square as represented by the outline of element 31 in FIG. 2. And the region of best focus is a plane that coincides with display surface 29 so that best focus is achievable across all of element 31.

However, because optical axis OB is ordinarily horizontal, it is frequently inconvenient to form the image on a display surface centered on optical axis OB, for in such a situation the projector blocks the view of those immediately behind it and members of the audience block the view of those behind them. To remedy this, it is customary to project the image onto a display surface located above the projector and off optical axis OB instead of directly in front of the projector and on the axis. This is accomplished simply by tilting mirror 23 in a counter clockwise direction so that the angle between the mirror normal and optic axis OA of lens 24 is greater than 45°. Consequently, the angle between the mirror normal and the planes in which transparency 18 and Fresnel lens 17 are situate becomes less than 45°. And the optical axis of the projector head imaging system no longer coincides with line AOB.

Such projection, however, causes keystone distortion; that is, the image becomes larger and therefore wider at the top than at the bottom. Thus, if transparency 18 is a square, the image that is formed on display surface 29 is a trapezoid as represented by the outline of element 32 in FIG. 2. Moreover, with such projection best focus is achievable only along one horizontal band across the image formed on the display surface, for the plane of best focus intersects the plane of the display surface. Similarly, if the image is projected downwards by tilting mirror 23 in a clockwise direction, an equivalent distortion represented by element 33 of FIG. 2 and an equivalent limitation on the region of best focus are encountered.

Alternatively, if the ceiling height is limited, it is customary to turn the whole projector at an angle to surface 29 so that the image is projected to the right or the left of the projector. In such cases, if transparency 18 is a square, the images that are formed on display surface 29 are trapezoids as represented by the outline of elements 34 and 35, respectively, of FIG. 2; and the regions of best focus are single vertical bands. Note that in all these cases of distortion and limited best focus the display surface 29, which is transverse to axis OB, is not transverse to the optical axis of the projector head imaging system.

Methods are available for reducing keystone distortion and improving the focus over the display surface. For example, when the image is projected up to a display screen, the top of the screen can be tilted forward to a position where the keystone distortion is less. And the projector can also be tilted. These methods, however, are not always convenient and at times can be very complicated as, for example, when the screen to be tilted is a large auditorium screen. With my invention, the need for tilting the screen or the projector is obviated.

A typical embodiment of my invention is projector 41 of FIG. 3A. This device comprises a box 42 in which there is a light source 43; movable rods 44 each of which is mounted at one end in one of universal joints 45 in box 42; and a projector head, or light directing means, 46, supported by rods 44 over box 42.

Light source 43 comprises a filament 43A and a spherical reflector 43B mounted concentric with filament 43A. For reasons that will become apparent below, light source 43 is mounted in box 42 so that the light appears to originate at the same height from the bottom of the box as universal joints 45. Such a condition is achieved if filament 43A is on the same level as universal joints 45, which is the relationship shown in FIG. 3A. Box 42 is ordinarily opaque on all sides except the side opposite projector head 46 where it is open. In this opening is a Fresnel condenser lens 47 that is coupled at one end by link 50 to at least one of the movable rods 44 in such a fashion that when the rods pivot on universal joints 45, lens 47 moves with the rods in a plane transverse to its optical axis. Additional support for lens 47 is provided by a rim 48 on which lens 47 can slide when it is moved by rods 44. Of course, rim 48 is located in a plane transverse to the optical axis of lens 47; and to minimize interference with the light transmitted through lens 47 from light source 43, rim 48 extends from the walls of box 42 only to the periphery of lens 47. If necessary to protect lens 47 from scratching or dust, a transparent cover plate 49 can be placed on top of the lens.

Movable rods 44 number at least three, each of which is parallel to the others but at least one of which is not coplanar with the others, and are set in universal joints 45 in the base and the universal joints 53 in projector head 46. As a result of this arrangement, the angular orientation of projector head 46 and its contents with respect to box 42 and its contents is fixed no matter how much the position of projector head 46 with respect to box 42 may be translated by moving rods 44. Moreover, because the rods are mounted in universal joints instead of ball-and-socket joints, the projector head cannot twist about an axis parallel to the rods.

Two of the movable rods are shown in FIG. 3A. If there are only three rods, the third rod is located behind one of the two rods shown; and the rods are positioned with respect to each other so that the universal joints 45 in which they are mounted preferably form the corners of an equilateral triangle. Such a position is implied in FIG 3A. If four rods are used, one rod is located behind each of the two rods shown; and universal joints 45 in which the rods are mounted preferably form the corners of a square.

Projector head 46 is comprised of two parts: a support bracket 51 and an optical imaging system mounted in casing 52. Bracket 51 is secured to rods 44 by universal joints 53 and, in turn, supports casing 52. The optical system within casing 52 comprises a mirror 54 and an imaging lens system. Typically the lens system comprises a lens 55 situated between mirror 54 and light source 43 and a lens 56 situated between mirror 54 and a display surface 61 onto which the light is imaged. The optical axis OC of lens 55 is perpendicular to the plane in which Fresnel lens 47 can be moved and is also perpendicular to optical axis OD of lens 56 at the reflecting surface of mirror 54. Axes OC and OD and a normal to mirror 54 all lie in the same plane, namely, the plane of the drawing. Mirror 54 is mounted so that there is a first angle of 45° between a normal to the mirror and optical axis OC of lens 55 and a second angle of 45° between a normal to the mirror and optical axis OD of lens 56. Consequently, the optical axis of the projector head imaging system is coincident with line COD; mirror 54 can be said to reflect the optical axis of this imaging system from an incident axis represented by axis OC to a reflected axis represented by axis OD; and the angle between the normal to mirror 54 and the plane in which Fresnel lens 47 can be moved is also 45°.

Casing 52 is mounted on bracket 51 so that it can be raised and lowered by suitable means. Typically these means are a rack 57 mounted on casing 52 and a pinion gear 58 mounted to bracket 51. Appropriate clamps, not shown, allow any position of rods 44 or projector head 46 to be maintained as long as desired.

In operation, the object that is to be illuminated and projected onto display surface 61 is placed on top of cover plate 49. Typically this object is a flat transparency shown as element 60 in FIG. 3A. Light from light source 43 is directed through Fresnel lens 47, cover plate 49 and transparency 60 and is then incident on lens 55 of projector head 46. This light next goes through lens 55, is reflected by mirror 54 onto lens 56 and is imaged onto display surface 61. This image is focused by adjusting the distance between the imaging system in casing 52 and transparency 60 by means of rack 57 and pinion gear 58. When my overhead projector is positioned as shown in FIG. 3A so that light source 43, Fresnel lens 47 and transparency 60 are centered about optical axis OC and the optical axis of lens 47 coincides with axis OC, light is directed from the projector head to form an image that is centered about optical axis OD. In such a case, if transparency 60 is a square and if the transparency is transverse to optical axis OC and display surface 61 is transverse to optical axis OD so that both transparency and display surface are transverse to the optical axis of the projector head imaging system, the image that is formed on display surface 61 is also a square as represented by the outline of elements 71 in FIG. 4. Moreover, because the plane of best focus coincides with display surface 61, best focus is achievable across all of the image formed on surface 61.

When it is desired to project the image to some position not on a level with the projector head, the projector head is moved: if it is desired to raise the position of the image, the projector head is moved forward; if it is desired to move the position of the image to either side, the projector head is moved in that direction; if it is desired to lower the position of the image the projector head is moved backwards. However, the position of mirror 54 with respect to lenses 55 and 56 is not changed; and because propector head 46 is sunpported by at least three rods 44 mounted in universal joints, the angular orientation of projector head 46 with respect to any element or plane in box 42 is not changed when the projector head is moved. Consequently, optical axis OC remains perpendicular to the planes in which transparency 60 and Fresnel lens 47 are moved; and the angle between the normal to mirror 54 and the planes in which transparency 60 and Fresnel lens 47 are moved is still 45°. Moreover, the optical axis of the projector head imaging system remains coincident with line COD.

For the convenience of the reader, the position of projector head support rods 44, projector head 46, transparency 60 and Fresnel lens 47 for upwards projection is shown in FIG. 3B. The elements of FIG. 3B are the same as in FIG. 3A; but projector head 46 has been moved forward and slightly downwards by pivoting support rods 44 in a clockwise direction about universal joints 45. Despite this movement, however, the angle between the normal to mirror 54 and the planes in which transparency 60 and Fresnel lens 47 are moved remains at 45° because projector head 46 is supported by at least three rods 44 mounted in universal joints. Simultaneously, Fresnel lens 47, its cover plate 49 and transparency 60 have been moved forward through the same angle as projector head 46 a shorter distance because Fresnel lens 47 is connected to at least one of support rods 44. In this position, as shown in FIG. 3B, light source 43, Fresnel lens 47 and transparency 60 are not centered about optical axis OC. However, because lens 47 is connected to at least one of support rods 44, lens 47 tracks the motion of projector head 46; and because of this and the position of light source 43 on the same level as universal joints 45, light source 43, the center of Fresnel lens 47 and the center of mirror 54 remain approximately in a straight line. Consequently, for the projector head displacement shown in FIG. 3B, the light focused by lens 47 at lens 55 has an angular component that causes it to be directed out of lens 56 at an upwards angle to form on the display surface an image above the level of projector head 46. It can be shown, however, that this image is not marred by keystone distortion. So if transparency 60 is a square, and if the transparency is transverse to optical axis OC and display surface 61 is transverse to optical axis OD so that both transparency and display surface are transverse to the optical axis of the projector head imaging system, the image that is formed is also a square as is represented by the outline of element 72 in FIG. 4. And it can also be shown that the plane of best focus still coincides with display surface 61 so that best focus is achievable across all of element 72.

Similarly, if the image of a square transparency is projected down or to the right or left by obvious changes in the position of the apparatus of FIGS. 3A and 3B, the image that is formed is also a best-focus square as is represented by the outline of elements 73, 74 and 75 in FIG. 4. Indeed, worthy of special note is the fact that it is possible with my projector to project an undistorted best-focus image to any position off the optical axis simply by moving the position of the projector head with respect to the Fresnel lens and the transparency. With the prior art projector shown in FIG. 1, unless the whole projector is shifted the only possible displacement of the image on the display surface is in the vertical direction.

An elementary exercise in trigonometry may give the reader some appreciation of the amount of projector head displacement necessary to achieve a certain increase in the height of the image on the display surface. With reference to FIG. 3B, if the distance between light source 43 and transparency 60 is six inches, if the distance between transparency 60 and projector head 46 is two feet, if the distance between projector head 46 and display surface 61 is eleven feet, and if it is desired to raise the image by four feet, then it can readily be shown that the projector head must be moved forward until optical axis OC of lens 55 is approximately 9.6 inches forward of the center of Fresnel lens 47. To do this, the projector head must be moved a total of twelve inches from its position when Fresnel lens 47 is centered on optical axis OC of lens 55. This, of course, is accomplished by moving support rods 44 which are approximately thirty inches long, in a clockwise direction through an angle $\phi = \tan^{-1}(12/30) = 220$. Consequently the downward displacement of projector head 46 is approximately 2.3 inches. Throughout this movement, however, it should be remembered that both the angular orientation of mirror 54 with respect to lenses 55 and 56 and the angular orientation of the imaging lens system with respect to box 42 and any plane defined by points in box 42 remain constant. Consequently, the angles between axis OC and a normal to mirror 54 and between axis OD and a normal to mirror 54 are always 45°; optical axis OC of lens 55 is always perpendicular to the planes of transparency 60 and lens 47; and the normal to mirror 54 always intersects these planes at an angle of 45°.

Many modifications to this embodiment will be obvious to those skilled in the art. For example, I have shown in FIGS. 3A and 3B that light source 43 is mounted in box 42 at the same height from the bottom of the box as universal joints 45 because in this position the light focused by Fresnel lens 47 tracks projector head 46, as is evident from simple geometric considerations. Obviously other configurations could be used that are optically equivalent to positioning the light source as I have indicated. Thus, universal joints 45 could be positioned in the plane of Fresnel lens 47; lens 47, plate 49 and transparency 60 could be stationary; and light source 43 could be linked to an extension from at least one of rods 44 so that it, rather than lens 47, moved when rods 44 were moved.

Other forms of condensers could be used in place of Fresnel lens 47. And, although an overhead projector without a condensing lens would be less efficient, clearly my invention can also be practiced without a condensing lens.

Similarly, any number of well known imaging lens systems could be used to image the object onto the display surface. That shown in FIGS. 3A and 3B is illustrative. There are other lens systems in which all the lens elements are located before the mirror and others where they are all located after the mirror. Obviously there are also equivalent imaging systems that use the internal reflection of a prism instead of the reflection of a mirror; and both mirror and prism reflectors are referred to in the claims by the words "reflecting surface." Moreover, although mirror 54 in the preferred embodiment of my invention is positioned so that its normal intersects at an angle of 45° the planes in which transparency 60 and Fresnel lens 47 are moved, my invention can be practiced with different orientations of the mirror. However, the greater the deviation of the angle of intersection from 45°, the greater the keystone distortion that is encountered. For small deviations this distortion may be so small that it is hardly noticed, but for large deviations it may not be tolerable.

Still other embodiments and modifications can be made by those skilled in the art without departing from the spirit and scope of the invention.

What is claimed is:

1. In an overhead projector comprising:
   a light source,
   first mounting means where an object may be placed to be illuminated by the light source, a first plane being defined through the location where the object may be placed, and
   light directing means comprising a reflecting surface for directing light from the object to a display surface at a particular angle,
   the improvement characterized in second mounting means for translating the reflecting surface laterally with respect to the first plane so that a normal to the reflecting surface intersects the first plane at a constant angle regardless of the displacement of the reflecting surface with respect to the first plane, whereby the particular angle at which light is directed from the light directing means to the display surface is varied by varying the lateral displacement of the reflecting surface with respect to the first plane.

2. The overhead projector of claim 1 wherein:
   the first mounting means comprises means for mounting a planar object in the first plane; and
   the angle at which the normal to the reflecting surface intersects the first plane is approximately 45 degrees.

3. The overhead projector of claim 1 wherein the second mounting means comprises at least three parallel rods, one end of each of which rods is mounted in a universal joint in a base of the projector and the other end of which is mounted in a universal joint connected to the light directing means, not all of the rods being coplanar.

4. The overhead projector of claim 1 further comprising:
   focusing means for focusing light from the light source at the light directing means; and
   means for moving said focusing means laterally in step with any movement of said light directing means enough to focus light from the light source at the light directing means.

5. The overhead projector of claims 1, 2, 3, or 4 wherein:
   the light directing means forms an image of an object placed in the first mounting means;
   said light directing means having an optical axis that is reflected by the reflecting surface of the light directing means, thereby establishing an incident optical axis and a reflected optical axis;
   the object being substantially transverse to the optical axis of the light directing means; and
   the image being substantially transverse to the optical axis of the light directing means.

6. The overhead projector of claim 5 wherein:
   the angle between a normal to the reflecting surface and the incident optical axis is approximately 45 degrees; and
   the angle between a normal to the reflecting surface and the reflected optical axis is approximately 45 degrees.

7. The overhead projector of claims 3 or 4 wherein the light source is mounted in the base of the projector at approximately the same distance from the first plane as are the universal joints through which the parallel rods are mounted to the base, whereby, when the rods are moved through an angle, a line from the light source through the focusing means to the light directing means is moved through substantially an equal angle.

8. An overhead projector comprising:
   a base in which is defined a first plane;
   a light source;
   at least three support rods, a first end of each of which is mounted in a universal joint in the base;
   mounting means where an object may be placed for illumination by the light source; and
   light directing means for directing light from the object to a display surface at a particular angle, said means being supported above the base by the support rods, a second end of each of which rods is mounted in a universal joint in the light directing means, whereby the light directing means may be laterally translated with respect to the base;
   said light directing means comprising a reflecting surface, the normal to which intersects the first plane at a specified angle regardless of the lateral displacement of the reflecting surface with respect to the first plane, whereby the particular angle at which light is directed from the light directing means to the display surface can be varied by varying the lateral displacement of the reflecting surface with respect to the first plane.

References Cited

UNITED STATES PATENTS 2,552,990   5/1951   McKay _____ 355—52

FOREIGN PATENTS 718,642   3/1942   Germany _____ 353—98

OTHER REFERENCES

"Variable Magnification Viewer," W. Carlough and H. Palmer, I.B.M. Technical Disclosure Bulletin, vol. 6 No. 1, June 1963.

SAMUEL S. MATHEWS, Primary Examiner

U.S. Cl. X.R.

353—98